US010672403B2

(12) United States Patent
Khoury et al.

(10) Patent No.: US 10,672,403 B2
(45) Date of Patent: Jun. 2, 2020

(54) AGE COMPENSATION IN BIOMETRIC SYSTEMS USING TIME-INTERVAL, GENDER AND AGE

(71) Applicant: PINDROP SECURITY, INC., Atlanta, GA (US)

(72) Inventors: Elie Khoury, Atlanta, GA (US); Matthew Garland, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 113 days.

(21) Appl. No.: 15/890,967

(22) Filed: Feb. 7, 2018

(65) Prior Publication Data
US 2018/0226079 A1    Aug. 9, 2018

Related U.S. Application Data

(60) Provisional application No. 62/455,854, filed on Feb. 7, 2017.

(51) Int. Cl.
*G10L 17/26*    (2013.01)
*G10L 15/26*    (2006.01)
*H04L 29/06*    (2006.01)
*G06K 9/00*    (2006.01)
*G06F 21/32*    (2013.01)
*G06K 9/62*    (2006.01)
(Continued)

(52) U.S. Cl.
CPC ............. *G10L 17/26* (2013.01); *G06F 21/32* (2013.01); *G06K 9/00221* (2013.01); *G06K 9/00885* (2013.01); *G06K 9/6267* (2013.01); *G10L 15/265* (2013.01); *G10L 17/04* (2013.01); *G10L 17/18* (2013.01); *G10L 25/30* (2013.01); *H04L 63/0861* (2013.01); *G06K 9/00926* (2013.01); *G06K 2009/00322* (2013.01)

(58) Field of Classification Search
CPC ...................................................... G10L 17/26
USPC ............................................................ 704/250
See application file for complete search history.

(56) References Cited

U.S. PATENT DOCUMENTS 7,133,792 B2    11/2006    Murakami et al.
7,545,961 B2    6/2009    Ahern et al.
(Continued)

FOREIGN PATENT DOCUMENTS

JP    2014170488 A    9/2014

OTHER PUBLICATIONS

Buyukyilmaz et al., "Voice Gender Recognition Using Deep Learning", Advances in Compuer Science Research, vol. 58, pp. 409-411, 2016.

(Continued)

*Primary Examiner* — Susan I McFadden
(74) *Attorney, Agent, or Firm* — Foley & Lardner LLP

(57) ABSTRACT

A score indicating a likelihood that a first subject is the same as a second subject may be calibrated to compensate for aging of the first subject between samples of age-sensitive biometric characteristics. Age of the first subject obtained at a first sample time and age of the second subject obtained at a second sample time may be averaged, and an age approximation may be generated based on at least the age average and an interval between the first and second samples. The age approximation, the interval between the first and second sample times, and an obtained gender of the subject are used to calibrate the likelihood score.

22 Claims, 3 Drawing Sheets

(51) Int. Cl.
  *G10L 25/30* (2013.01)
  *G10L 17/18* (2013.01)
  *G10L 17/04* (2013.01)

(56) References Cited

U.S. PATENT DOCUMENTS

| | | | | |
|---|---|---|---|---|
| 8,085,907 | B2* | 12/2011 | Jaiswal | G10L 17/26 |
| | | | | 379/88.02 |
| 8,260,350 | B2* | 9/2012 | Jaiswal | H04M 1/575 |
| | | | | 379/142.01 |
| 8,417,289 | B2* | 4/2013 | Jaiswal | H04M 1/575 |
| | | | | 379/142.01 |
| 8,768,648 | B2* | 7/2014 | Panther | A61B 5/6838 |
| | | | | 702/160 |
| 8,925,058 | B1 | 12/2014 | Dotan et al. | |
| 9,405,967 | B2 | 8/2016 | Samet | |
| 10,157,272 | B2* | 12/2018 | Kim | G06F 21/32 |
| 2015/0067822 | A1 | 3/2015 | Randall | |
| 2016/0063235 | A1 | 3/2016 | Tussy | |
| 2016/0269411 | A1 | 9/2016 | Malachi | |
| 2016/0314616 | A1 | 10/2016 | Su | |
| 2017/0169113 | A1 | 6/2017 | Bhatnagar et al. | |
| 2017/0351907 | A1 | 12/2017 | Bataller et al. | |
| 2017/0365118 | A1 | 12/2017 | Nurbegovic et al. | |
| 2017/0372128 | A1 | 12/2017 | Owen et al. | |

OTHER PUBLICATIONS

Erbilik, et al. "Improved age prediction from biometric data using multimodal configurations" Biosig, Sep. 10-12, 2014, pp. 179-186.
Han et al., "Age Estimation from Face Images: Human vs. Machine Performance," ICB, Jun. 4-7, 2013.
Jain et al., "Guidelines for Best Practices in Biometrics Research", ICB, Phuket, Thailand, May 19-22, 2015.
Kelly et al., "Score-Aging Calibration for Speaker Verification",. IEEE/ACM TASLP vol. 24, Iss. 12, Aug. 24, 2016, pp. 2414-2424.
Ling et al. "A Study of Face Recognition as People Age", ICCV, 2007.
Sdjadi et al., "Speaker Age Estimation on Conversational Telephone Speech Using Senone Posterior Based I-vectors", IEEE ICASSP, Mar. 20-25, 2016.
Notification of Transmittal of the International Search Report and the Written Opinion of the International Searching Authority dated May 3, 2018, in corresponding International Application No. PCT/US2018/017249, 15 pages.

* cited by examiner

AGE COMPENSATION IN BIOMETRIC SYSTEMS USING TIME-INTERVAL, GENDER AND AGE

This disclosure claims domestic benefit, under 35 U.S.C. § 119, of U.S. Provisional Application No. 62/455,854 filed 7 Feb. 2017, titled "Age Compensation in Biometric Systems Using Time-Interval, Gender and Actual Age", which application is incorporated herein by reference thereto.

BACKGROUND

Biometrics has been defined as the "Automated recognition of individuals based on their behavioral and biological characteristics". [ISO/IEC JTC1 2382-37:2012]. Some examples of biometric processes include DNA matching, fingerprint recognition, face recognition, and speaker recognition.

Two fundamental tenets of biometrics are distinctiveness and persistence. (See Jain et al., "Guidelines for Best Practices in Biometrics Research," ICB, 2015.) That is, in order to automatically recognize an individual, the behavior and/or biological characteristics must be distinctive, and must persist. It has been recognized, however, that over time many relevant characteristics can change due to diet, illness, trauma, smoking, aging, and even stress. What is needed is a technique that works for any biometric modality having degraded persistence due to such factors, particularly the aging factor, and particularly for speaker recognition and face recognition.

SUMMARY

The presently claimed inventions are directed to a methods and apparatuses for use, for example in a call center, voice activated control, facial recognition security wall, digital assistant, or the like, to automatically recognize an enrolled person (e.g., a caller) or to exclude a fraudulent person.

A method according to an embodiment includes obtaining a first sample of an age-sensitive biometric characteristic of an enrollee, the first sample being collected from the enrollee at a first sample time. An age of the enrollee is obtained. A second sample of an age-sensitive biometric characteristic is obtained, the second sample being collected from a caller at a second sample time after the first sample time. An age of the caller is obtained. A gender of the enrollee and/or the caller is obtained. An interval between the first sample time and the second sample time is determined. An average age is determined using the obtained age of the enrollee and the obtained age of the caller. An age approximation is generated using the average age and the interval. A likelihood score determination algorithm is calibrated using the gender, the age approximation and the interval.

According to an embodiment, at least one of the age of the enrollee and the age of the caller is an age estimate, wherein an age estimate of the enrollee is generated from the first sample and an age estimate of the caller is generated from the second sample.

According to an embodiment, the obtained gender is a gender estimate generated using information collected during the first sample time, the second sample time or another time.

According to an embodiment, the calibrated likelihood score determination algorithm is used to adjust a likelihood score for indicating whether the enrollee and the caller are the same person.

According to an embodiment the method may further include use of a deep neural network to determine the likelihood score. The deep neural network may be trained to discriminate between callers based on at least a statistical model produced using the first sample.

According to an embodiment, a statistical model for the enrollee is updated using the second sample when the adjusted likelihood score exceeds a predetermined threshold.

According to an embodiment, at least one of the first sample and the second sample is an audio voice sample.

According to an embodiment, at least one of the first sample and the second sample is a facial image sample.

According to an embodiment at least generating the age estimate of the caller is performed only when the interval is greater than a predetermined time threshold.

According to an embodiment, generating the age estimate of the enrollee includes at least one of weighting and offsetting based on the obtained gender.

According to an embodiment, generating the age estimate of the caller includes at least one of weighting and offsetting based on the obtained gender.

According to an embodiment, generating of the age approximation further includes at least one of weighting and offsetting of the obtained age of the caller based on the interval.

According to an embodiment, the information for generating the gender estimate is derived from the first sample at the first sample time.

According to another embodiment, a caller recognition apparatus includes receiving circuitry and one or more processors. The receiving circuitry is configured to obtain a first sample (e.g., an enrollment sample) of at least an age-sensitive biometric characteristic collected from an enrollee at a first sample time and to obtain a second sample (e.g., a test sample) of an age-sensitive biometric characteristic of a caller at a second sample time after the first sample time. The processor(s) are configured to: obtain an age of the enrollee; obtain an age of the caller, obtain a gender of at least one of the enrollee and the caller, determine an interval between the first sample time and the second sample time; determine an average age using the obtained age of the enrollee and the obtained age of the caller, generate an age approximation using the average age and the interval, and calibrate a likelihood score determination algorithm using the gender, the age approximation and the interval.

According to an embodiment, at least one of the age of the enrollee and the age of the caller is an age estimate, where an age estimate of the enrollee is generated by the at least one processor from the first sample and an age estimate of the caller is generated by the at least one processor from the second sample.

According to an embodiment, the obtained gender is a gender estimate generated using information collected during the first sample time, the second sample or another time.

According to an embodiment, the at least one processor is further configured to: generate and store a statistical model for the enrollee based on the first sample, compute a likelihood score indicating a likelihood that the first sample and the second sample are both from the enrollee; adjust the likelihood score based on the calibrated likelihood score determination algorithm, determine whether the adjusted likelihood score is greater than a predetermined threshold score, and, if the adjusted likelihood score is greater than the predetermined threshold score, update the statistical model based on the second sample.

According to an embodiment, the apparatus may additionally include a deep neural network configured to compute the likelihood score, where the deep neural network is trained to discriminate between callers based at least on the statistical model.

According to an embodiment, to generate the age estimate of the enrollee includes at least one of weighting and offsetting based on the gender.

According to an embodiment, to generate the age estimate of the caller includes at least one of weighting and offsetting based on the gender.

According to an embodiment, the information collected to generate the gender estimate is included in the first sample.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

FIGURES

Figure 1:
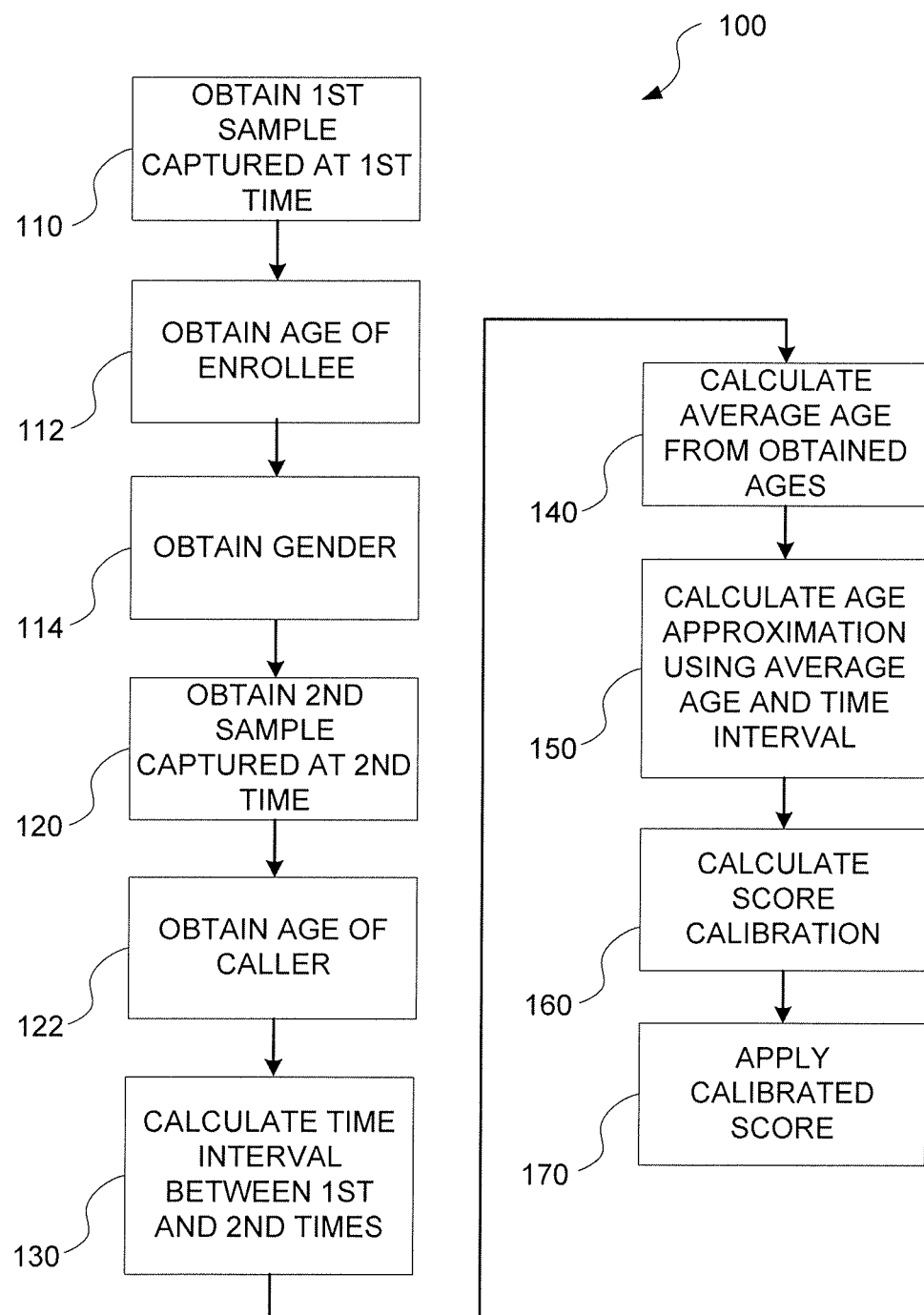
FIG. 1 is flowchart illustrating a method of calibrating a likelihood score.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary" used throughout this description means "serving as an example, instance, or illustration," and should not necessarily be construed as preferred or advantageous over other embodiments, whether labeled "exemplary" or otherwise. The detailed description includes specific details for the purpose of providing a thorough understanding of the embodiments of the disclosure. It will be apparent to those skilled in the art that the embodiments of the disclosure may be practiced without these specific details. In some instances, well-known structures and devices may be shown in block diagram form in order to avoid obscuring the novelty of the exemplary embodiments presented herein.

It has been recognized that as humans age, various physical attributes change. Some attributes, may change only subtly over a short period, but can be recognized in only a few years or less. For example, as one ages, the respiratory system can become less efficient, slowing speech, elongating syllables, and requiring more pauses for breath; laryngeal cartilage becomes less flexible (more and earlier for men than for women), resulting in changes in fundamental frequency and the formation of formants; hearing loss can cause one to speak more loudly; and the voice may become shaky. For example, experiments have shown that the fundamental frequency of a male speaker may drop 20-30 Hz during middle to late middle age, and then rise in later life. These, and even smaller changes in physical attributes and their derivatives (or, biometric characteristics) can reduce the effectiveness of systems that rely on such attributes for biometric security measures, particularly when users of such systems tend to engage the system only rarely. In one example, nearly 50% of customers called their bank only one time in 8 months. The inventors have recognized that age-related changes in one's voice can, even in a few months' time, reduce the reliability of conventional automatic voice recognition (AVR) systems. The invention(s) disclosed herein mitigate the loss in reliability by compensating for an age change for an AVR enrollee, considering the enrollee's age, gender, and interval since enrollment (or previous AVR engagement), thus improving reliability of an AVR system employing this approach.

In other applications, the disclosed invention permits anticipation of age-related changes in a biometric characteristic in order to detect and reject fraudulent attempts to authenticate a user. For example, in a replay attack a fraudster uses a previously captured image or media recording of an authorized person in an attempt to fool an AVR system. An AVR system employing the disclosed invention could recognize an absence of anticipated age-related changes in the fraudulent sample provided, and deny access or at least flag the call for additional authentication or review.

Researchers, recognizing the reality of changing bodily characteristics have proposed many methods for compensating for, or eliminating the effects of such changes on biometric security processes. Although most, even all, biometric characteristics may be subject to age-related changes, it has been found that biometric systems utilizing face recognition or speaker recognition may be more sensitive to change than systems that utilize, e.g., DNA matching or fingerprint recognition (See, e.g., Ling et al., "A Study of Face Recognition as People Age," ICCV, 2007) 1351 One technique intended to account for aging is called "score calibration". (See Kelly et al., "Score-Aging Calibration for Speaker Verification," IEEE/ACM TASLP, 2016.) That technique utilizes a time-interval between an enrollment sample and test sample to correct a "likelihood score" generated in a biometric system to help compensate for aging-related errors. However, the inventors for the present disclosure recognized some drawbacks to conventional score calibration. In particular, conventional score calibration treats all speakers the same despite age and gender differences. For example, conventional score calibration for a speaker who has aged five years between enrollment at age 20 and testing at age 25 is the same as for a speaker tested five years after enrollment at age 80. Moreover, conventional score calibration does not consider any differences in age-related changes between male and female speakers during different stages of life.

The inventors have recognized that spectral characteristics of the voice do not change in the same manner for female and male speakers. Specifically, the inventors have improved conventional score calibration by considering differences in the amount of change between enrollment and testing times for a speaker (a) at different stages of life and/or (b) for gender. For example, women's voices tend to be less effected by age than men's voices.

Accordingly, the methods and devices disclosed herein improve and extend previous work by using not only time-interval between enrollment and test samples, but also the gender and the age of the subject. As the age and the gender of a particular speaker are often not given in advance, the methods and devices disclosed herein automatically estimate these characteristics.

A likelihood score, as used in biometric security systems, such as automatic voice recognition systems, may indicate a probability that an enrollment sample and a later test sample come from the same person. This likelihood score is derived, in some implementations, using a deep neural network (DNN) trained to distinguish subjects. As described in more detail below, an enrollment sample may be used to generate a statistical model against which later test samples are compared. However, as noted above, over time the enrollment sample may become less precisely representative of the subject due to aging, resulting in an inappropriately low likelihood score and, therefore, false negatives in recognition and authentication.

FIG. 1 is flowchart illustrating a method 100 of calibrating a likelihood score. The method 100 bases the calibration, at least in part, on a determination of age and gender of an enrollee at enrollment time, and a determination of at least age at a later test time. Specifically, operation 110 includes obtaining a first sample of an age-based biometric characteristic at a first sample time. For example, the first sample time may be an enrollment time, at which time a voice sample, or other age-sensitive biometric characteristic sample, may be captured. Capture of the first sample may include simple recording using conventional recording techniques. In some embodiments, capturing of the first sample may include conventional processing of the sample, such as noise reduction, equalization, sample size normalization and the like for audio samples. In other embodiments an image (including video) sample may be processed for color correction, luminosity, or other image characteristics.

Figure 4:
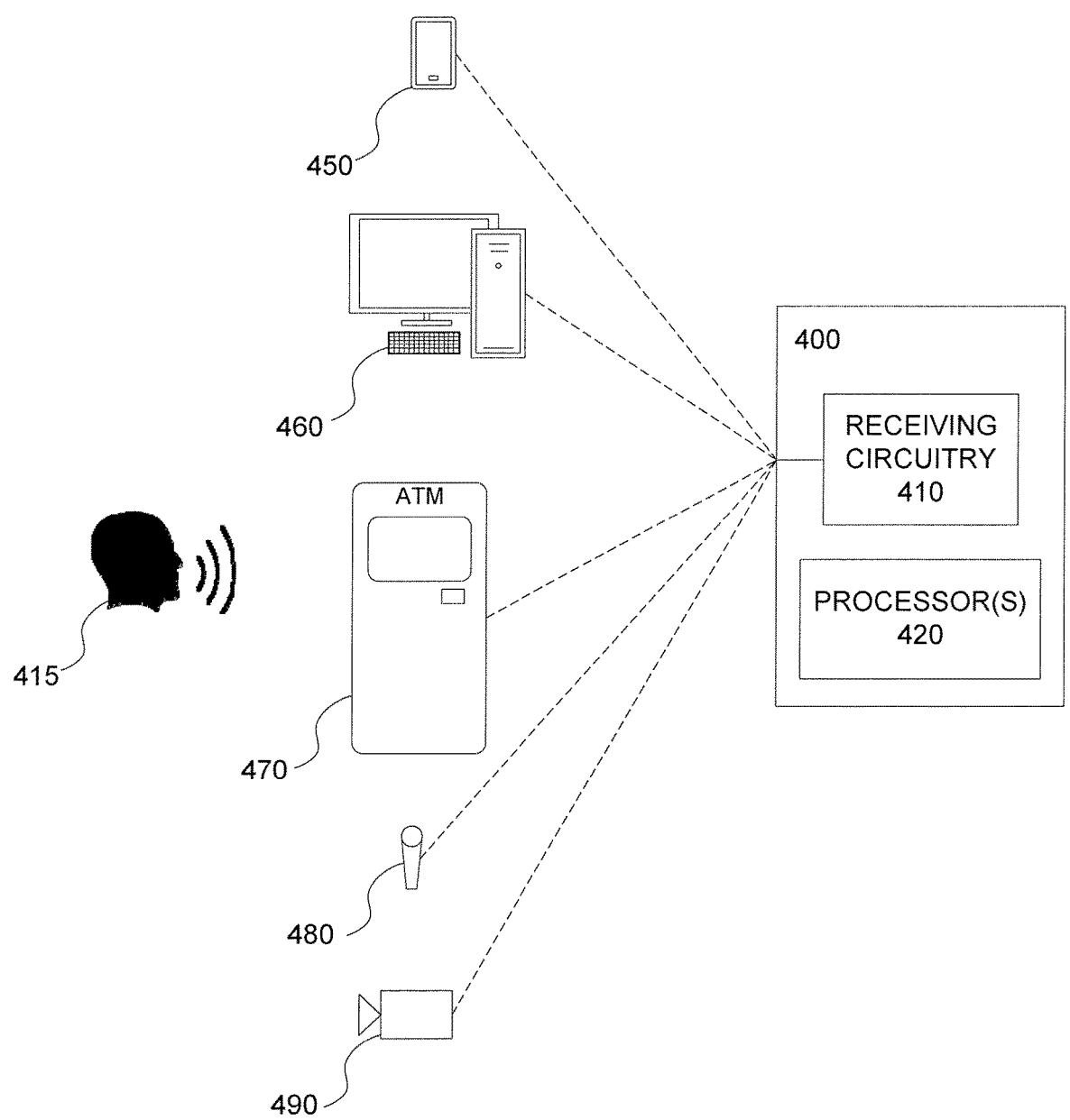
FIG. 4 is a block diagram illustrating a caller recognition apparatus.

As will be described in more detail with respect to FIG. 4, the first sample may be captured via microphone or camera, including, in some instances, specialized microphone or camera features optimized for the capture of audio or images. In other instances, the method may be configured to employ a microphone or camera of a mobile phone. The first sample may be stored in a random access memory device for later retrieval and/or processing. In some instances, the first sample may be stored in multiple stages or levels of processing. The first sample may be stored in a database in conjunction with other information specific to the enrollee. For example, the first sample may in some embodiments be associated with an enrollee's name, account number, password, PIN, call and/or account history, preferences, contact information, and/or other user-specific data, any of which may be encrypted for security or other reasons.

In operation 112, an age of the enrollee is obtained. In exemplary embodiments the age obtained for the enrollee is an age estimate derived from the first sample using a conventional technique. (See, e.g., Sadjadi, et al., "Speaker Age Estimation On Conversational Telephone Speech Using Senone Posterior Based I-Vectors" IEEE ICASSP, 2016; see also, e.g., Han et al., "Age Estimation from Face Images: Human vs. Machine Performance," ICB 2013.) The obtained age of the enrollee may be stored in conjunction with the first sample or in conjunction with an account for the enrollee. In some embodiments the age of the enrollee may be calculated from a birthdate age obtained from an outside source, such as a credit report, user application, public or private database, or the like.

In operation 114, a gender is obtained for at least one of the enrollee and the caller. In exemplary embodiments, the first sample is used to generate a gender estimate using a conventional technique. Gender may be estimated using one or more of characteristics of the first sample. (See, e.g., Buyukyilmaz et al., "Voice Gender Recognition Using Deep Learning", Advances in Computer Science, 2016.) In some embodiments, obtaining the gender may follow capture of the second sample (operation 120), and the gender may be obtained or estimated using information collected during or after the first sample time, the second sample time or another time. In some embodiments, an enrollee's gender may be obtained and stored directly from an input by the enrollee, e.g., at an account creation time, enrollment time, or another time. Alternatively, gender may be obtained, derived, or estimated for a verified enrollee, from a credit report, social media, or other database or public or private data or the like, and then stored in association with the first sample and/or derivatives thereof.

Operation 120 includes obtaining a second sample of an age-based biometric characteristic at a second sample time. The second sample may be a test sample, i.e., for testing the subject of the second sample against the first or enrollment sample. The second sample time would typically be later than the first sample time. In some embodiments, and for purposes of utilizing the sample calibration described herein, the second sample, time may be months or years later than the first sample time. The second sample may be captured in a similar manner to the first sample. In many instances the second sample may be captured using a different microphone or camera than was used for the first sample, and/or may be captured in a different environment. For example, while a second or test sample may be captured using a mobile phone, the first or enrollment sample may in some implementations be captured in a different environment or using a microphone or camera of different quality. Accordingly, the capture of the second sample may include processing to render the second sample closer in quality to that of the first sample (or vice versa). Alternatively, means for generating a likelihood score, described below, may be configured to ignore, compensate for, or otherwise lessen the effects of differences in recording quality.

In operation 122, an age of the caller may be obtained. In some embodiments, the obtained age of the caller may be an age estimate generated from the second sample in the same way described above with respect to the first sample.

The times (e.g., dates) of capture for the first sample and the second sample may be captured. For example, a timestamp of the first sample time may be stored in correspondence with the first or enrollment sample. In operation 130, an interval between the first sample time and the second sample time is calculated. In one embodiment the interval may be calculated by simply subtracting the first sample time from the second sample time. For example, a time stamp may be noted at the second sample time and subtracted from a time stamp captured and stored at the first sample time.

In operation 140 an average age may be determined from the age obtained for the enrollee and the age obtained for the caller. For example, a sum of the age estimates may be divided by two, resulting in an average age.

In operation 150 an age approximation is calculated using the average age and the interval. In one example, the interval is divided by 2 and subtracted from the average age. In an illustrative example, an age for a speaker in a first voice sample is 20 years, while an estimated age for the speaker in a second voice sample is 28 years, resulting in an average age of 24 years. An interval calculated from time stamps for the first voice sample (e.g., in 2012) and the second voice sample (e.g., in 2017) would be 5 years. Accordingly, an age approximation of 21.5 years would result by subtracting, from the average age of 24 years, the interval of 5 years divided by 2. Alternatively, in some instances the age approximation may be calculated further in consideration of the obtained ages, gender, and/or other factors. For example, the average age may be adjusted in view of such factors. However, the anticipated effect of the gender and age approximation can be realized in calibrating a likelihood score.

In operation 160, the obtained gender, interval, and age approximation are used to calibrate a likelihood score determination algorithm. That is, the effects of aging on the age-sensitive biometric characteristic are addressed in view of gender by weighting and/or shifting values used in the determination of a likelihood score. In a specific implementation, Equation 1, below, may be used to derive a calibrated score:

$$S_c = \omega_0 + \omega_1 S_r + \omega_2 Q_{\Delta t} + \omega_3 Q_{a,g}, \quad \text{Eq.1}$$

where $W=[\omega_0, \omega_1, \omega_2, \omega_3]$ is a vector of weights, $S_r$ is a raw biometric score to be calibrated, $Q_{\Delta t}$ is a quality measure accounting for the time interval, $Q_{a,g}$ is a quality measure accounting for both the speaker's age and gender. Equation 1 is trained using Logistic regression with a cross entropy loss. $Q_{\Delta t}$ can be represented in at least two different ways. For example, $Q_{\Delta t}$ may be represented by $Q_1(x)=x$, or by $Q_2(x)=\log x$, where $x=\Delta t$. Other quality measures accounting for the interval are considered. $Q_{a,g}$ may be determined as follows:

$$Q_{a,g} = \delta_g \cdot (a-\alpha_f)^n + (1-\delta_g) \cdot (a-\alpha_m)^n, \quad \text{Eq.2}$$

where a is age, $\alpha_f$, $\alpha_m$ and n are constants, and $\delta_g$ is the Kronecker delta function accounting for a speaker's gender as a categorical value, as follows:

$$\delta_g = \begin{Bmatrix} 1 & \text{if Female} \\ 0 & \text{if Male} \end{Bmatrix}. \quad \text{Eq. 3}$$

The raw score $S_r$, time interval $\Delta t$, the speaker age a, and the speaker gender $\delta_g$ may be used in a feature vector $[S_r, \Delta t, a, \delta_g]$. Accordingly, any linear or non-linear binary classifier may be used, where the positive class is a "match" (i.e., an enrollment speaker and test speaker are the same), and the negative class is a "non-match" (i.e., enrollment speaker and test speaker are not the same). Because of the type of data employed in the feature vector, non-linear classifiers may be more effective.

In operation 170, the calibrated likelihood score is applied. For example, the age- and gender-compensated score calibration may result in a higher or lower likelihood score, which is then compared with a predetermined threshold score. Applications of the score calibration are described below in the context of an AVR system.

The order of operations detailed above in relation to FIG. 1 may be rearranged. For example, in some implementations (not illustrated), the gender may be generated from the second sample, may be generated from both samples and compared, or may be generated from another sample or source. In another rearrangement example, the calculation 130 of the interval may be performed before or simultaneously with obtaining the age of the caller 122. In general, order of operations may be arranged for speed and efficiency.

Figure 2:
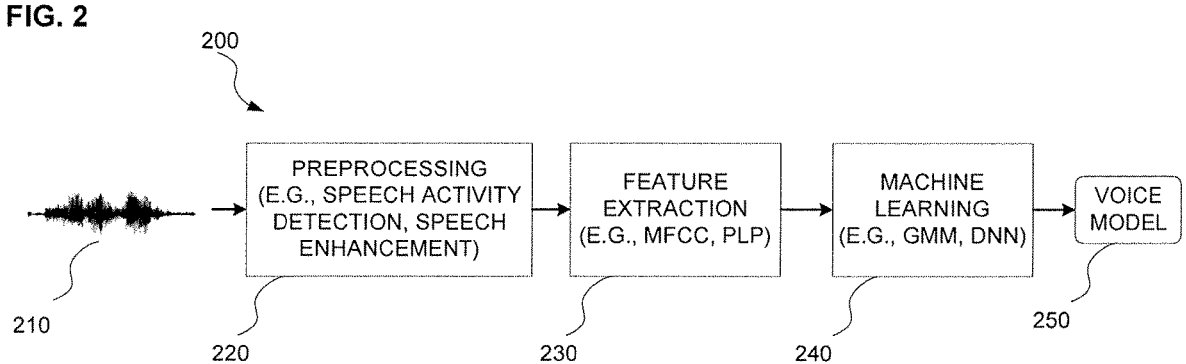
FIG. 2 is a flow diagram for a process for developing a so-called "voiceprint" from a voice sample.
Figure 3:
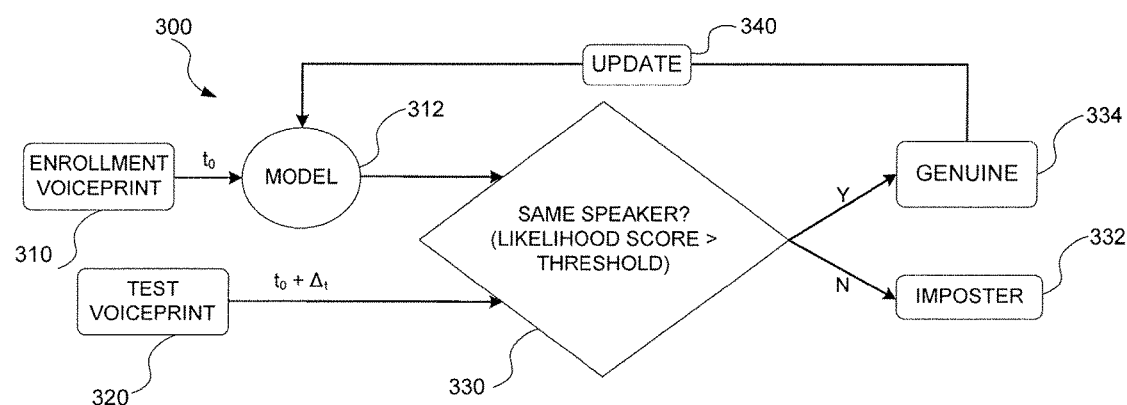
FIG. 3 is a flow diagram illustrating a process of determining whether a test voiceprint 320 is from a same speaker as an enrollment voiceprint.

FIGS. 2-3, described in detail below, illustrate a process in which the calibrated likelihood score may be applied according to element 170 of FIG. 1. As mentioned earlier, a likelihood score may be determined by comparing a statistical model of an enrollment sample with a test sample. FIG. 2 is a flow diagram for a process 200 of developing a so-called "voiceprint" or voice model 250 from a voice sample 210 (e.g., an enrollment sample or a test sample). The inventors have previously disclosed a process for generating a voiceprint using a deep neural network (DNN). (See U.S. Pat. No. 9,824,692, incorporated herein by reference.) That process is outlined as follows. Upon receiving the voice sample 210, the voice sample may be pre-processed 220, including, e.g., detecting speech activity (e.g., removing undesirable non-speech portions of the voice sample 210), and/or speech enhancement (e.g., noise reduction or addition, equalization, etc.). In some implementations, a voice sample 210 captured at enrollment and used for generating the voiceprint 250 may, for example, be pre-processed 220 to better match characteristics anticipated in a most common test channel by limiting frequency, adding noise, etc. At operation 230 features are extracted from the pre-processed voice sample using, e.g., linear predictive codes (LPC), perceptual linear prediction (PLP), Mel-frequency cepstral coefficients (MFCC), and/or the like. At operation 240, machine learning produces the voiceprint 250 from the extracted features using a Gaussian mixture model (GMM), deep neural network (DNN), or the like. Other methods of generating a voiceprint 250 are contemplated. As an alternative to the voiceprint 250 described above, a conventional universal background model (UBM) may be estimated using a Gaussian mixture model (GMM), using acoustically aware i-Vectors, and/or using phonetically-aware i-Vectors. A voiceprint 250 or UBM may be utilized in generating and applying a likelihood score as illustrated in FIG. 3.

FIG. 3 is a flow diagram illustrating a process 300 of determining whether a test voiceprint 320 is from a same speaker as an enrollment voiceprint 310 (the enrollment voiceprint 310 and test voiceprint 320 corresponding to respective voiceprints 250 described above with respect to FIG. 2). The enrollment voiceprint 310 received at a first sample time ($t_0$) is used to generate a voice model 312, and may be stored with the corresponding sample time, age at enrollment, and gender obtained as described with respect to FIG. 1. A test voiceprint 320 received and processed at a second sample time ($t_0+\Delta t$) is compared with the voice model 312. A comparison operation 330 includes generation of a likelihood score that is calibrated according to the process 100 described above with respect to FIG. 1, and may also include comparison of the generated likelihood score to a predetermined threshold score. That is, the estimated age at enrollment, estimated gender, and interval ($\Delta t$) may be used to modify an original raw score, resulting in a lower equal error rate (EER) compared with a likelihood score generated without calibration, and even compared with likelihood scores generated using calibrations that do not consider estimated age and estimated gender.

The calibrated likelihood score is compared with a predetermined threshold score. If the calibrated likelihood score is less than the threshold score, the test voiceprint 320 is considered an imposter 332. That is, the speaker who produced the test voiceprint 320 is judged to be different from the speaker who produced the enrollment voiceprint 310. Conversely, if the calibrated likelihood score is greater than the threshold score, the test voiceprint 320 is considered to be genuine 334. That is, the speaker who produced the test voiceprint 320 is judged to be the same as the speaker who produced the enrollment voiceprint 310. In a stand-alone application, the predetermined threshold score may be fixed. In a system employing multiple factors for authentication, the threshold may have multiple dependencies, and may in some implementations be calculated per enrollee. For some multi-factor systems the calibrated score may be used without consideration of a predetermined threshold score.

Changes in the voice are likely to increase as Δt increases. Accordingly, if not addressed, the likelihood score for any given test sample would decrease with time since enrollment even if calibrated as described above. To minimize this decline, the enrollment model 312 may be updated 340 based on the test voiceprint 320 when the voiceprint 320 is judged to be genuine 334. Moreover, a stored age and gender may be updated to be based on the test voiceprint 320 for comparison with a later-received test voiceprint.

The above-described processes may be implemented in a caller recognition apparatus, such as a particularly configured computer server. FIG. 4 is a block diagram illustrating a caller recognition apparatus 400. For example, such caller recognition apparatus 400 may include receiving circuitry 410 for receiving an enrollment sample and for receiving a test sample. The receiving circuitry 410 may include a microphone or camera for directly receiving the enrollment and test samples. Additionally, or alternatively, the receiving circuitry may include a computer modem configured to receive a digital or analog telephone call from a user 415 and to capture voice data from the telephone call. Additionally, or alternatively, the receiving circuitry may include a computer network connection device configured to receive data including samples of age-sensitive biometric characteristics captured elsewhere (e.g., at a user's mobile phone 450, a PC 460, automated teller machine (ATM) 470, a business' microphone 480 or camera 490, or the like).

The caller recognition apparatus may further include one or more processors 420 configured generate a gender estimate, generate age estimates for an enrollment sample (e.g., first sample) and a test sample (e.g., second sample), determine a time interval between the enrollment and test samples, determine an average age using the age estimates for the enrollment and test samples, and generate an age approximation based on the average age and the interval, as described above with respect to the process 100 in FIG. 1. The processor(s) 420 may be further configured to generate and store a statistical model for an enrollee/user 415 based on the enrollment sample (or, as described above with respect to FIG. 3, in an update 340 based on the test (second) sample). The processor(s) may be further configured to compute a likelihood score indicating a likelihood that the enrollment sample and test sample are both from the same person (e.g., the enrollee). Computation of the likelihood score may include use of a deep neural network to discriminate between callers, based at least on the model, the gender estimate, the age approximation and the interval. The processor(s) 420 may be further configured to adjust (or calibrate) the likelihood score, or the process for generating the likelihood score, based on the age approximation, the estimated gender and the interval. The processor(s) 420 may be further configured to determine whether the likelihood score is greater than or less than a predetermined threshold score, thus respectively indicating that the test sample is or is not from the same speaker as the enrollment sample. The processor(s) may be further configured to update the model (e.g., model 312 in FIG. 3) if the likelihood score has been adjusted and is greater than the predetermined threshold score.

As suggested above, the enrollment sample and the test sample may each be an audio voice sample, may each be a digital image, or may be some other representation of an age-sensitive biometric characteristic. It is contemplated that the age and gender may be estimated for a test sample that represents a different characteristic than the enrollment sample. That is, in some embodiments the test sample could be, e.g., a voice sample, while the enrollment sample could be an image.

In some embodiments, the generation of the age estimate of the enrollee and/or the caller may include weighting or offsetting the age estimate based on the estimated gender of the subject user.

In the preceding detailed description, various specific details are set forth in order to provide an understanding of improvements for speaker recognition in a call center, and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The present invention generally relates to an apparatus (e.g., a computer server) for performing the operations described herein. This apparatus may be specially constructed for the required purposes such as a graphics processing unit (GPU), digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a non-transient computer readable storage medium, such as, but not limited to, any type of disk including optical disks, CD-ROMs, magneto-optical disks, read-only memories (ROMs), random access memories (RAMs), EPROMs, EEPROMs, magnetic or optical cards, integrated memory, "cloud" storage, or any type of computer readable media suitable for storing electronic instructions.

Algorithms and displays presented herein are not inherently related to any particular computer or other apparatus. Various general-purpose systems may be configured by programming in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   obtaining, by a server, a first sample of an age-sensitive biometric characteristic of an enrollee, the first sample collected from a first electronic device associated with the enrollee at a first sample time;
   obtaining, by the server, an age of the enrollee;
   obtaining, by the server, a second sample of an age-sensitive biometric characteristic, the second sample collected from a second electronic device associated with a caller at a second sample time after the first sample time;
   obtaining, by the server, an age of the caller;
   obtaining, by the server, a gender of at least one of the enrollee and the caller;
   determining, by the server, an interval between the first sample time and the second sample time;
   determining, by the server, an average age using the obtained age of the enrollee and the obtained age of the caller;
   generating, by the server, an age approximation using the average age and the interval;
   generating, by the server, a first likelihood score that the caller is the enrollee based on the age-sensitive characteristic of the first sample and the age-sensitive characteristic of the second sample;
   calibrating, by the server, the first likelihood score based on the gender, the age approximation, and the interval, thereby generating a second likelihood score; and
   authenticating, by the server, the caller when the second likelihood score satisfies a threshold.

2. The method according to claim 1, wherein at least one of the age of the enrollee and the age of the caller is an age estimate, an age estimate of the enrollee being generated from the first sample and an age estimate of the caller being generated from the second sample.

3. The method according to claim 2, wherein at least generating the age estimate of the caller is performed only when the interval is greater than a predetermined time threshold.

4. The method according to claim 2, wherein generating the age estimate of the enrollee includes at least one of weighting and offsetting based on the obtained gender.

5. The method according to claim 2, wherein generating the age estimate of the caller includes at least one of weighting and offsetting based on the obtained gender.

6. The method according to claim 1, wherein the obtained gender is a gender estimate generated using information collected during the first sample time, the second sample time, or another time.

7. The method according to claim 1, further comprising: using a calibrated likelihood score determination algorithm to adjust the first likelihood score for indicating whether the enrollee and the caller are the same person.

8. The device according to claim 7, further comprising: using a deep neural network to determine the first likelihood score, the deep neural network being trained to discriminate between callers based at least on a statistical model produced using the first sample.

9. The method according to claim 7, further comprising: updating a statistical model for the enrollee using the second sample when the second likelihood score exceeds a predetermined threshold.

10. The method according to claim 1, wherein at least one of the first sample and the second sample is an audio voice sample.

11. The method according to claim 1, wherein at least one of the first sample and the second sample is a facial image sample.

12. The method according to claim 1, wherein generating the age approximation further includes at least one of weighting and offsetting of the obtained age of the caller based on the interval.

13. A caller recognition apparatus comprising:
   receiving circuitry configured to obtain a first sample of at least an age-sensitive biometric characteristic collected from a first electronic device associated with an enrollee at a first sample time and to obtain a second sample of an age-sensitive biometric characteristic collected from a second electronic device associated with a caller at a second sample time after the first sample time; and at least one processor configured to:
  obtain an age of the enrollee,
  obtain an age of the caller,
  obtain a gender of at least one of the enrollee and the caller,
  determine an interval between the first sample time and the second sample time,
  determine an average age using the obtained age of the enrollee and the obtained age of the caller,
  generate an age approximation using the average age and the interval,
  generate a first likelihood score that the caller is the enrollee based on the age-sensitive characteristic of the first sample and the age-sensitive characteristic of the second sample;
  calibrate the first likelihood score based on the gender, the age approximation, and the interval, thereby generating a second likelihood score; and
  authenticate the caller when the second likelihood score satisfies a threshold.

14. The caller recognition apparatus according to claim 13, wherein at least one of the age of the enrollee and the age of the caller is an age estimate, an age estimate of the enrollee being generated by the at least one processor from the first sample and an age estimate of the caller being generated by the at least one processor from the second sample.

15. The caller recognition apparatus according to claim 14, wherein to generate the age estimate of the enrollee includes at least one of weighting and offsetting based on the gender.

16. The caller recognition apparatus according to claim 13, wherein the gender is a gender estimate generated using information collected during the first sample time, the second sample time, or another time.

17. The caller recognition apparatus according to claim 13, wherein the at least one processor is further configured to:
  generate and store a statistical model for the enrollee based on the first sample;
  compute the first likelihood score indicating a likelihood that the first sample and the second sample are both from the enrollee,
  adjust the first likelihood score based on a calibrated likelihood score determination algorithm to generate the second likelihood score;
  determine whether the second likelihood score is greater than a predetermined threshold score; and
  if the second likelihood score is greater than the predetermined threshold score, update the statistical model based on the second sample.

18. The device according to claim 16, further comprising a deep neural network configured to compute the first likelihood score, the deep neural network being trained to discriminate between callers based at least on the statistical model.

19. The caller recognition apparatus according to claim 13, wherein at least one of the first sample and the second sample is an audio voice sample.

20. The caller recognition apparatus according to claim 13, wherein at least one of the first sample and the second sample is a facial image sample.

21. The caller recognition apparatus according to claim 13, wherein the processor is configured to obtain the age of the caller only when the interval is greater than a predetermined time threshold.

22. The caller recognition apparatus according to claim 13, wherein to generate the age estimate of the caller includes at least one of weighting and offsetting based on the gender.

* * * * *